United States Patent
Matsuo et al.

(10) Patent No.: US 7,158,706 B2
(45) Date of Patent: Jan. 2, 2007

(54) OPTICAL FIBER

(75) Inventors: Shoichiro Matsuo, Sakura (JP);
Kuniharu Himeno, Sakura (JP);
Harada Koichi, Sakura (JP)

(73) Assignee: Fujikura Ltd., Tokyo (JP)

( * ) Notice: Subject to any disclaimer, the term of this patent is extended or adjusted under 35 U.S.C. 154(b) by 200 days.

(21) Appl. No.: 10/360,119

(22) Filed: Feb. 7, 2003

(65) Prior Publication Data

US 2003/0156810 A1     Aug. 21, 2003

(30) Foreign Application Priority Data

Feb. 13, 2002    (JP)    ............................ P2002-035657

(51) Int. Cl.
*G02B 6/036*    (2006.01)

(52) U.S. Cl. .................................................. 385/127

(58) Field of Classification Search ................ 385/123, 385/124, 126, 127
See application file for complete search history.

(56) References Cited

U.S. PATENT DOCUMENTS

| | | | |
|---|---|---|---|
| 5,613,027 A | 3/1997 | Bhagavatula | ................ 385/123 |
| 5,675,690 A | 10/1997 | Nouchi et al. | ............... 385/127 |
| 6,301,422 B1 | 10/2001 | Li | ............................... 385/127 |
| 6,396,987 B1* | 5/2002 | de Montmorillon et al. | ........................... 385/123 |
| 6,421,491 B1* | 7/2002 | Liu | ............................. 385/127 |
| 6,459,839 B1* | 10/2002 | Sauvageon et al. | ......... 385/123 |
| 6,490,396 B1* | 12/2002 | Smith | .......................... 385/123 |
| 2001/0021298 A1* | 9/2001 | Mukasa | ....................... 385/124 |
| 2004/0022509 A1* | 2/2004 | Tandon | ....................... 385/127 |
| 2004/0067034 A1* | 4/2004 | Rosenblum et al. | ........ 385/127 |

FOREIGN PATENT DOCUMENTS

| | | |
|---|---|---|
| CN | 1300376 A1 | 6/2001 |
| EP | 0 798 578 A1 | 10/1997 |
| EP | 1030200 | 8/2000 |
| JP | 2001-033647 | 2/2001 |
| JP | 2001-051148 | 2/2001 |
| JP | 2001-147338 | 5/2001 |
| WO | 99/18461 | 4/1999 |
| WO | WO-00/17681 A1 | 3/2000 |
| WO | WO-00/55661 A1 | 9/2000 |

OTHER PUBLICATIONS

R. Yamauchi et al. Design and performance of Gaussian-profile dispersion-shifted fibers manufactured by VAD process. Journal of Lightwave Technology, vol. LT-4, No. 8, pp. 997-1004, Aug. 1986.*
M. Ohashi et al. Optical loss property of silica-based single-mode fibers. Journal of Lightwave Technology, vol. 10, No. 5, pp. 539-543, May 1992.*
K.I. White, "Design parameters for dispersion-shifted triangular-profile single-mode fibres", Electronics Letters, IE Stevenage, GB, vol. 18, No. 17, Aug. 19, 1982, pp. 725-727.
S. Yin et al., "New design for non-zero dispersion-shifted fiber (NZ-DSF) with a large effective area over 100 UM2 and low bending and splice loss", Optics Communications, North-Holland Publishing Co. Amsterdam, NL, vol. 177, No. 1/6 2000, pp. 225-232.

* cited by examiner

*Primary Examiner*—Rodney Bovemick
*Assistant Examiner*—Mike Stahl
(74) *Attorney, Agent, or Firm*—Darby & Darby (57) ABSTRACT

An optical fiber is produced so as to have ring-shape refractive index profile such that chromatic dispersion is between +6 ps/nm/km or larger and smaller than +15 ps/nm/km in 1550 nm wavelength, the transmission loss is smaller than 0.210 dB/km, effective cross sectional area $A_{eff}$ is larger than 90 μm², dispersion slope is in a range of 0.05 ps/nm²/km and 0.08 ps/nm²/km. By doing this, an optical fiber having ring-shaped refractive index profile, enlarged effective cross sectional area, restricted dispersion slope, and low loss characteristics can be provided.

7 Claims, 12 Drawing Sheets

OPTICAL FIBER

BACKGROUND OF THE INVENTION

1. Field of the Invention

The present invention relates to an optical fiber. Particularly, the present invention relates to an optical fiber in which an effective cross sectional area $A_{\mathit{eff}}$ is enlarged so as to use for a long-haul wavelength multiple transmission system, and dispersion slope is restrained.

2. Description of Related Art

Transmission capacity for an optical fiber has increased drastically by the use of a Wavelength Division Multiplexing (hereinafter called WDM) method. In the WDM method, it is required that non-linear effect should be reduced and the chromatic dispersion should be controlled in an optical fiber, which is used for data transmission. For these purpose, the development for various optical fiber such as an optical fiber of which effective cross section a1 area $A_{\mathit{eff}}$ is enlarged, an optical fiber of which dispersion slope is reduced, and an optical fiber for compensating the dispersion slope, have been made.

In order to increase the transmission capacity of an optical fiber by the WDM method, there are, in general, two ways of approach. One is a method by which the number of the wavelengths to be multiplexed is increased. Another approach is that the transmission speed is increased.

Figure 9:
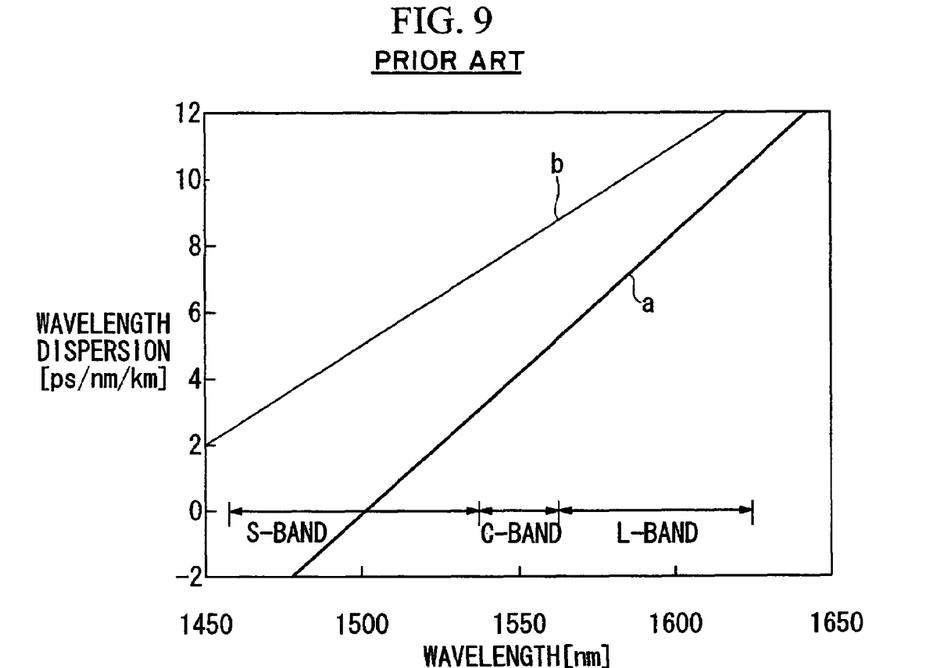
FIG. 9 is a view showing chromatic dispersion characteristics in a conventional WDM optical fiber.

For a method for increasing the number of the wavelengths to be multiplexed, an approach is proposed by which the wavelength bandwidth to be used for data transmission is enlarged. In FIG. 9A, chromatic dispersion characteristics of a common WDM optical fiber (a) is shown.

For an WDM optical fiber, 1550 nm wavelength bandwidth is commonly used. In particular, a wavelength bandwidth which is called Conventional Band (1530 to 1565 nm, hereinafter called C-Band) has been used commonly. However, recently, there are proposed approaches in which wavelengths such as Long wavelength Band (hereinafter called L-Band) in 1565 to 1625 nm and Short wavelength Band (hereinafter called S-Band) in 1460 to 1530 nm should be used for data transmission.

For example, an optical fiber shown in FIG. 9B is proposed in which the chromatic dispersion is enlarged so as to be used in S-Band, C-Band, and L-Band.

Figure 10:
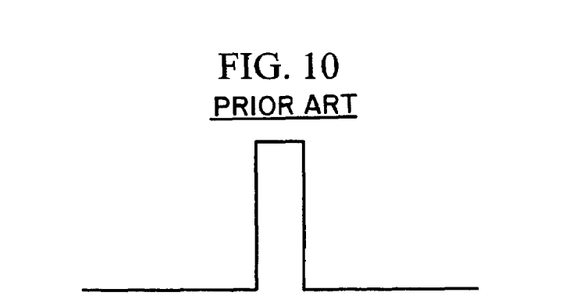
FIG. 10 is a view showing an example for a sigle-peak refractive index profile in a conventional optical fiber.
Figure 11:
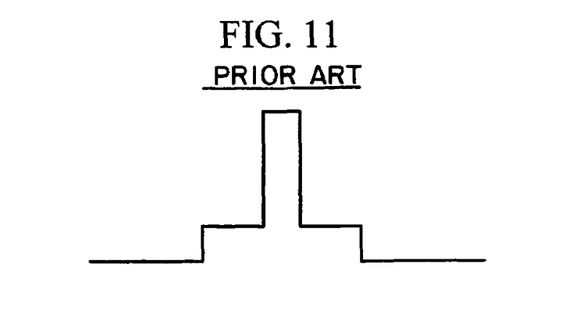
FIG. 11 is a view showing an example for a stepped refractive index profile in a conventional optical fiber.
Figure 12A:
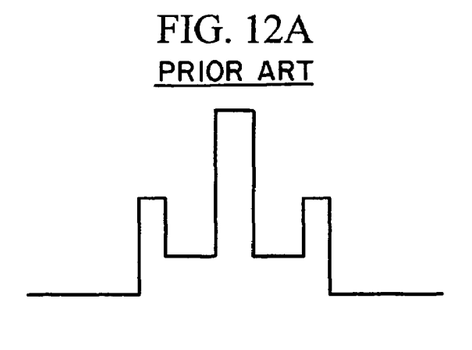
FIGS. 12A and 12B are views showing an example for a segment core refractive index profile in a conventional optical fiber.
Figure 12B:
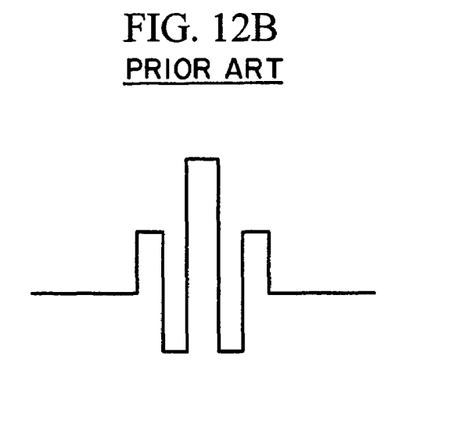

In such optical fibers, there are various kinds of refractive index difference. In FIGS. 10 to 12, examples for such optical fibers are shown.

Among these optical fibers, an optical fiber having single-peak refractive index profile shown in FIG. 10 is used for a single mode fiber in an ordinary 1.3 µm bandwidth. Also, an optical fiber shown in FIG. 11 having stepped refractive index profile in which refractive indexes in two layers are different, and an optical fiber shown in FIGS. 12A and 12B having a segment refractive index profile in which a high refractive index section is in the center part and a plurality of layers having different refractive indexes are disposed are commonly used for a zero dispersion shift fiber in the 1.55 µm bandwidth and a non-zero dispersion shift fiber (hereinafter called NZ-DSF) which has been developed for WDM data transmission.

For an optical fiber which is used for WDM data transfer, following characteristics are required.

First, it is necessary to restrict a non-linear effect. Such a purpose can be realized by enlarging an effective cross sectional area $A_{\mathit{eff}}$. Second, it is necessary to restrict an occurrence of four-photon-mixture. Such a purpose can be realized by obtaining a local dispersion. Third, it is necessary to restrict a linear distortion caused by chromatic dispersion. Such a purpose can be realized by reducing an average chromatic dispersion over an optical path. Lastly, in order to control dispersion in wide range bandwidth, it can be realized by reducing the dispersion slope.

The above NZ-DSF was designed so as to be satisfied the required characteristics. However, it is very difficult to enlarge the $A_{\mathit{eff}}$ and reduce the dispersion slope simultaneously. From a commercial point of view, an optical fiber ($A_{\mathit{eff}}$ enlarged NZ-DSF) in which $A_{\mathit{eff}}$ is enlarged to 70 µm² and the dispersion slope is 0.09 ps/nm²/km, and an optical fiber (low dispersion slope optical fiber) in which $A_{\mathit{eff}}$ is 50 µm² and the dispersion slope is reduced to 0.05 ps/nm²/km, are commonly used for NZ-DSFs.

Figure 13A:
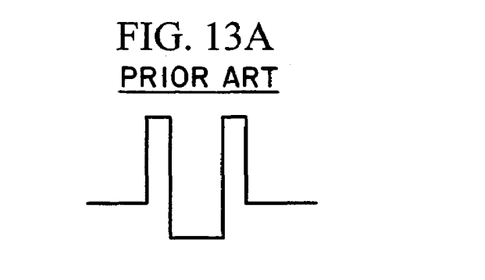
FIGS. 13A to 13C are views showing an example for a ring-shaped refractive index profile in a conventional optical fiber.
Figure 13B:
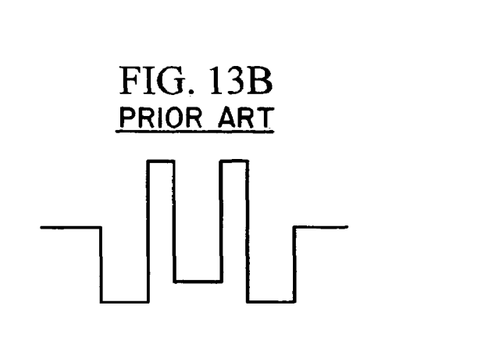
Figure 13C:
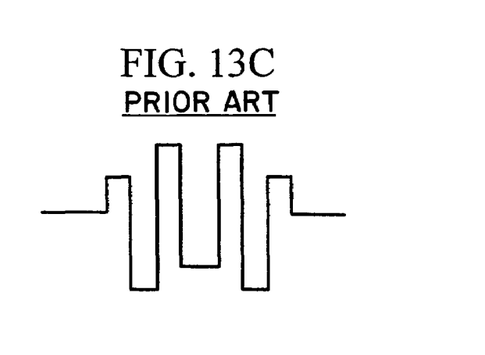

For an optical fiber which can realize more enlarged effective refractive index $A_{\mathit{eff}}$ and more reduced dispersion slope, an optical fiber shown in FIG. 13 having a ring-shape refractive index profile in which a central part of the core has low refractive index and high refractive index section therearound are disposed is known. For an optical fiber having such a ring-shaped refractive index profile, an optical fiber in which $A_{\mathit{eff}}$ enlarged to 100 µm² and the dispersion slope is restricted at 0.06 to 0.08 ps/nm²/km is reported in "ECOC '96 MoB. 3. 2".

However, there has not been a report that an optical fiber having the ring-shape refractive index profile can realize lower loss. For example, in the above report, 0.23 dB/km of loss has been reported. No other report mentions such lower loss characteristics. Therefore, it is necessary to reduce the transmission loss so as to realize an optical fiber having a ring-shaped profile.

Figure 14:
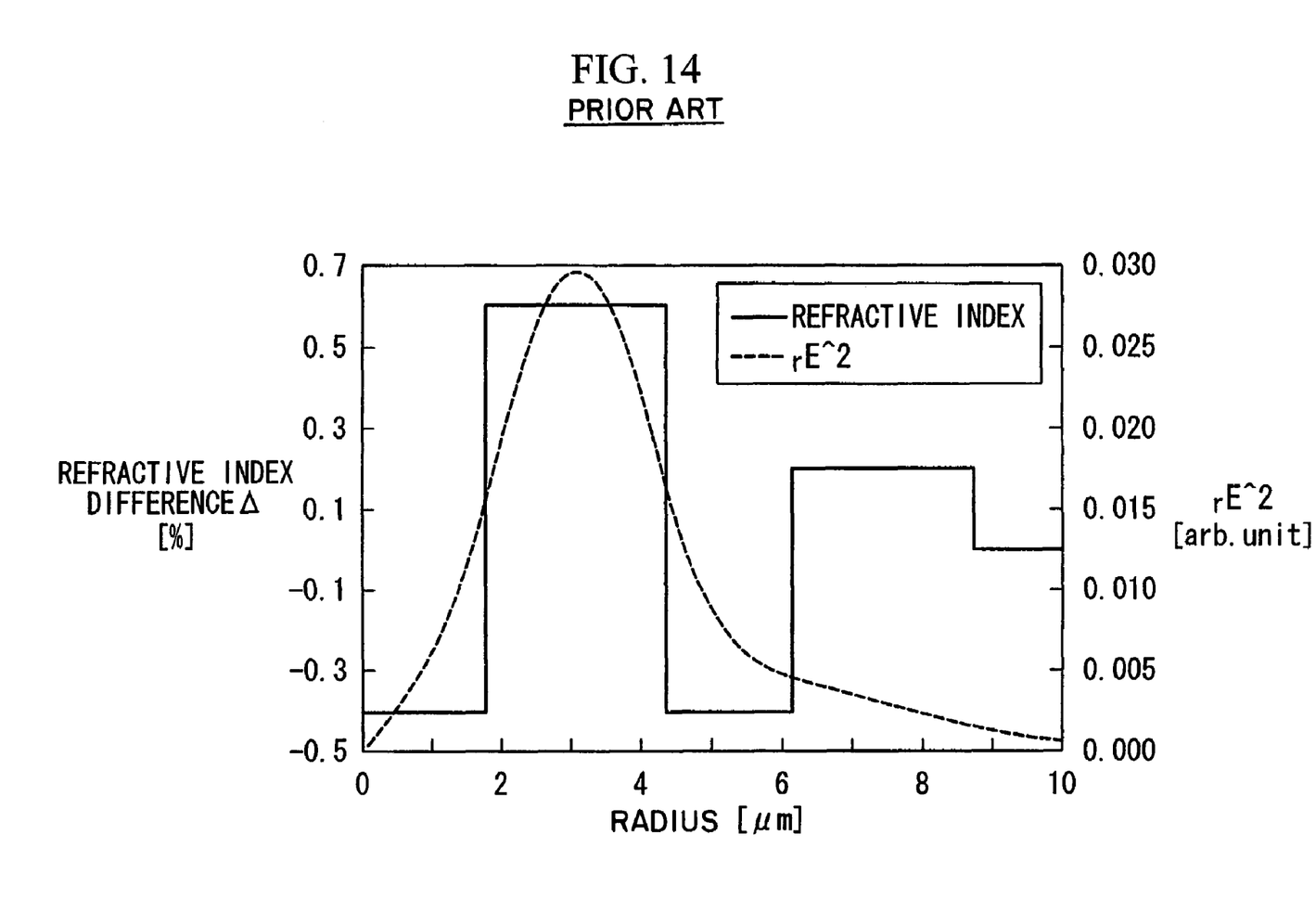
FIG. 14 is an example for refractive index profile in a conventional optical fiber.

In an optical fiber having conventional ring-shaped refractive index profile, an absolute value for a chromatic dispersion in 1550 nm wavelength is set to zero or lower than 6 ps/nm/km. Chromatic dispersion such as 6 ps/nm/km is in accordance with a specification of a conventional NZ-DSF. The refractive index profile of an optical fiber having such a chromatic dispersion area is shown in FIG. 14. Characteristics of this optical fiber is shown in TABLE 1.

TABLE 1

| | | | |
|---|---|---|---|
| TRANSMISSION LOSS | | [dB/km] | 0.231 |
| CABLE CUTOFF WAVELENGTH | λ cc | [nm] | 1440 |
| EFFECTIVE CORE CROSS SECTIONAL AREA | $A_{\mathit{eff}}$ | [µm²] | 93.9 |
| MODE FIELD DIAMETER | MFD | [µm] | 8.92 |
| CHROMATIC DISPERSION | | [ps/nm/km] | 5.0 |
| DISPERSION SLOPE | | [ps/nm²/km] | 0.071 |
| BENDING LOSS @ 20 φ | | [dB/m] | 7.4 |
| POLARIZATION MODE DISPERSION | PMD | [ps/√km] | 0.08 |

*Above values are measured under condition of 1550 nm wavelength

Figure 15A:
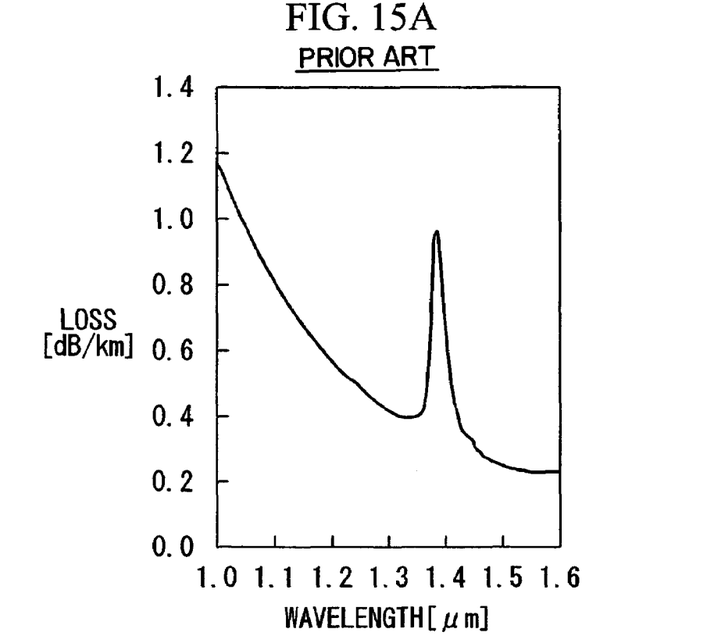
FIGS. 15A and 15B are examples for loss wavelength characteristics in a conventional optical fiber.
Figure 15B:
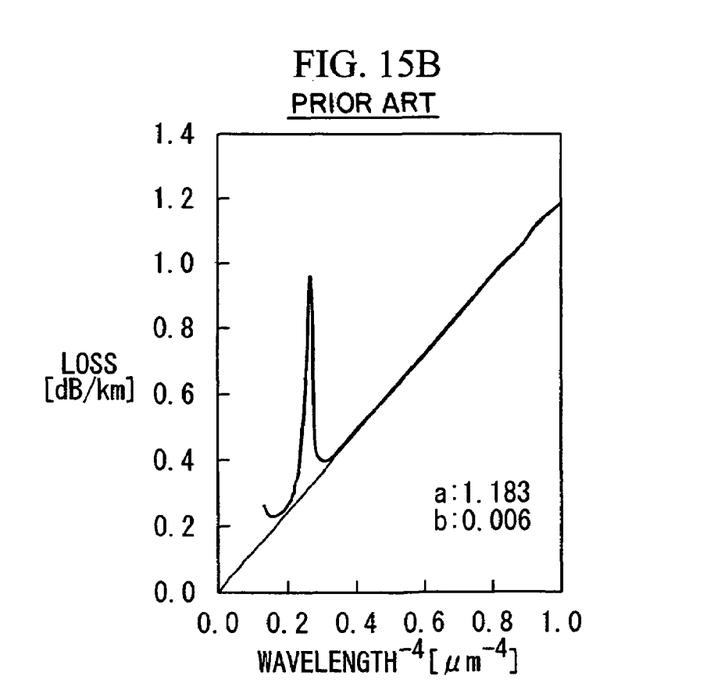

In FIG. 14, a horizontal axis indicates a distance from a center of the core in radial direction. A vertical axis indicates a refractive index difference between each core and the clad. Also, in FIG. 14, a product of a square of electric field E in a dominant mode which transmits in an optical fiber and the distance r in the radial direction is shown by dotted line. Also, in FIG. 15A, loss wavelength characteristics for wavelength λ is shown. In FIG. 15B, loss value under condition that the unit of the horizontal axis is $1/\lambda^4$.

The transmission loss of this optical fiber in the 1550 nm wavelength is 0.231 dB/km. This transmission loss is as high as that of the optical fiber having conventional ring-shaped refractive index profile. Also, value "a" which indicates an inclination to $1/\lambda^4$ is 1.183. Such a value is very large in contrast that a value "a" in an ordinary NZ-DSF is nearly 1.06. Such a high transmission loss in the optical fiber is caused by Rayleigh loss. In order to realize an optical fiber having low loss, it is necessary to reduce the Rayleigh loss.

SUMMARY OF THE INVENTION

The present invention was made in consideration of the above problems. An object of the present invention is to provide an optical fiber having an enlarged effective cross sectional area, restricted dispersion slope, and low loss multiple ring-shaped refractive index profile.

In order to solve the above problem, a first aspect of the present invention is an optical fiber having a core containing two or more layers of which refractive indexes are different such that one of the layer except a center part of the core has the largest refractive index, wherein chromatic dispersion is between +6 ps/nm/km or larger and smaller than +15 ps/nm/km in 1550 nm wavelength, and transmission loss is smaller than 0.210 dB/km. According to this feature, it is possible to realize low loss characteristics in an optical fiber having ring-shaped refractive index profile.

A second aspect of the present invention is an optical fiber wherein the core contains more than three layers of which refractive indexes are different.

A third aspect of the present invention is an optical fiber wherein refractive index of a layer in center part of the core is lower than refractive index of a core.

A fourth aspect of the present invention is an optical fiber wherein an effective cross sectional area in 1550 nm wavelength is larger than 90 μm².

According to these features, it is possible to realize an optical fiber which can restrict non-linear effect.

A fifth aspect of the present invention is an optical fiber wherein a dispersion slope in the 1550 nm wavelength is less than 0.08 ps/nm²/km.

According to this feature, it is possible to control the dispersion over a wide range of wavelength bandwidth; thus, it is possible to provide an optical fiber which can realize high-speed high-quality optical data transmission.

A sixth aspect of the present invention is an optical fiber wherein refractive indexes are different in four layers in the core, an effective cross sectional area is larger than 90 μm² in the 1550 nm, and the dispersion slope is smaller than 0.07 ps/nm²/km.

A seventh aspect of the present invention is an optical fiber having a power product of the refractive index profile is smaller than 0.45 wherein the refractive index profile is defined by a formula F1

$$MRIP = \frac{\int_0^r |\Delta(r)| r E^2(r) dr}{\int_0^r r E^2(r) dr} \quad \text{F1}$$

under condition that r is a distance from a center of the core in a radial direction, $\Delta(r)$ is a refractive index difference of the clad in a position of the distance r, E(r) is an electric field distribution for dominant mode of a transmitted light in the position of the distance r.

According to this feature, it is possible to reduce Rayleigh loss; thus, it is possible to realize an optical fiber having low loss characteristics.

As explained above, according to the present invention, an optical fiber is produced so as to have a core containing two or more layers of which refractive indexes are different such that one of the layer except a center part of the core has the largest refractive index, wherein chromatic dispersion is between +6 ps/nm/km or larger and smaller than +15 ps/nm/km in 1550 nm wavelength. Therefore, it is possible to realize low loss characteristics in an optical fiber having ring-shaped refractive index profile.

Also, because an optical fiber is produced such that an effective cross sectional area in 1550 nm wavelength is larger than 90 μm². Therefore, it is possible to realize an optical fiber which can restrict non-linear effect.

Also, because an optical fiber is produced such that a dispersion slope in the 1550 nm wavelength is less than 0.08 ps/nm². Therefore, it is possible to control the dispersion over a wide range of wavelength bandwidth; thus, it is possible to provide an optical fiber which can realize high-speed high-quality optical data transmission.

Also, an optical fiber is produced so as to have a power product of the refractive index profile which is smaller than 0.45. Therefore, it is possible to restrict the transmission loss lower than 0.210 dB/km. Also, it is possible to reduce the loss caused by the Rayleigh scattering; thus, it is possible to realize an optical fiber having low loss characteristics.

DETAILED DESCRIPTION OF THE INVENTION

The present invention is explained in detail as follows.

An optical fiber according to the present invention has a core containing two or more layers of which refractive indexes are different such that one of the layer except a center part of the core has the largest refractive index (hereinafter called ring-shaped refractive index profile), wherein chromatic dispersion is between +6 ps/nm/km or larger and smaller than +15 ps/nm/km in 1550 nm wavelength, and transmission loss is smaller than 0.210 dB/km.

In such an optical fiber having a ring-shaped refractive index profile, it is necessary to reduce the Rayleigh loss. For that purpose, the refractive index profile can be more even than that of a conventional optical fiber by setting the chromatic dispersion in 1550 nm wavelength to be in a range of +6 to +15 ps/nm/km which is larger than the chromatic dispersion in a conventional NZ-DSF. That is, it is possible to reduce dopants in an optical fiber; thus, Rayleigh loss can be reduced.

Figure 1:
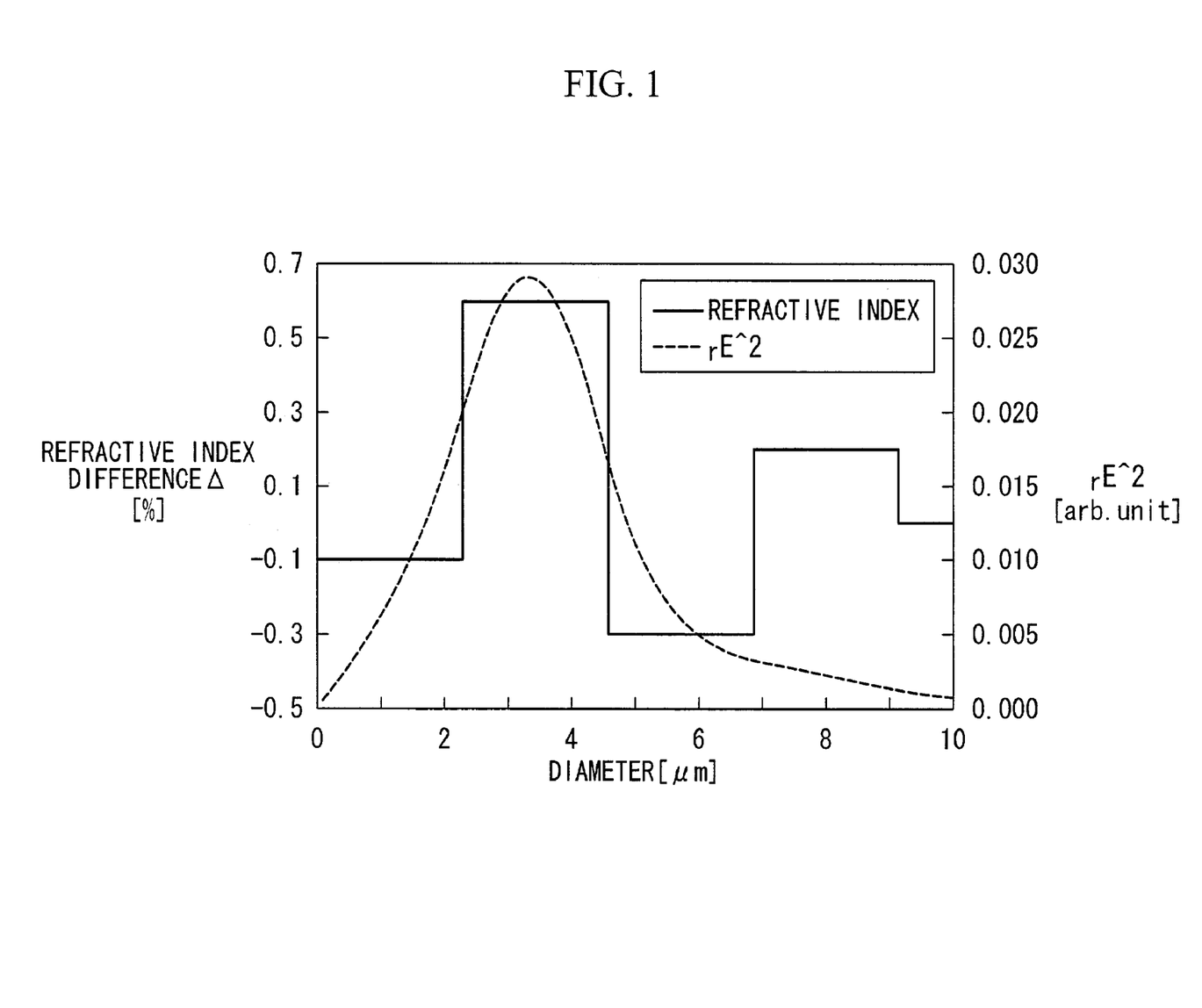
FIG. 1 is an example for refractive index profile of an optical fiber according to the present invention.

FIG. 1 shows a refractive index profile in an optical fiber under condition that the optical fiber has chromatic dispersion which is almost the same refractive index profile shown in FIG. 14 is designed to have more enlarged chromatic dispersion larger than +9 ps/nm/km. In FIG. 1, a horizontal axis indicates a distance from a center of the core in a radial direction. A vertical axis indicates a refractive index difference for each core to the clad. Also, in FIG. 1, a product of a square of electric field E in a dominant mode which transmits in an optical fiber and the distance r in the radial direction is shown by dotted line.

Figure 2:
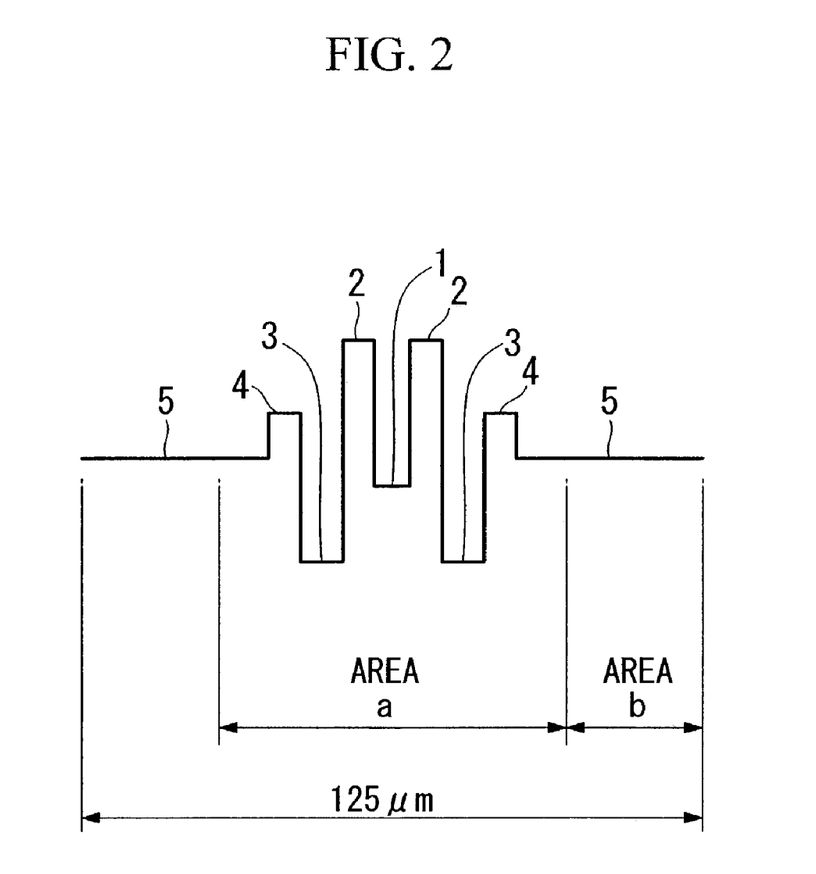
FIG. 2 is a view showing a refractive index profile in an optical fiber according to the present invention.

An example for refractive index profile in an optical fiber according to the present invention is shown in FIG. 2. In FIG. 2, reference numeral 1 indicates a first layer core section which is a center of the core. Reference numeral 2 indicates a second layer core section which is formed around the first layer core section 1 so as to have higher refractive index than that of the first layer core section 1. Reference numeral 3 indicates a third layer core section which is formed around the second layer core section 2 so as to have lower refractive index than that of the second layer core section 2. Reference numeral 4 indicates a fourth layer core section which is formed around the third layer core section 3 so as to have higher refractive index than that of the third layer core section 3. Reference numeral 5 indicates a clad which is formed around the fourth layer core section 4.

In this example, the refractive index in the first layer core section 1 and the refractive index in the third layer core section 3 are lower than that in the clad 5. Also, the refractive index in the second layer core section 2 is the highest. Here, the refractive index difference in the first layer core section 1 is $\Delta 1$ under condition that the refractive index in the clad 5 is a reference point. Also, the refractive index difference in the second layer core section 2 is $\Delta 2$. The refractive index difference in the third layer core section 3 is $\Delta 3$. The refractive index in the fourth layer core section 4 is $\Delta 4$. Under such condition, absolute value for the refractive index difference $\Delta 1$ in the first layer core section 1 and the refractive index difference $\Delta 3$ in the third layer core section 3 shown in FIG. 1 are smaller than that in the conventional optical fiber shown in FIG. 14.

An object of the present invention is to realize an optical fiber having low loss characteristics. The loss in the optical fiber greatly depends on the Rayleigh scattering in the optical fiber. Actually, the Rayleigh scattering caused in the optical fiber has a relationship with amount of dopant in an area where the Rayleigh scattering occurs and the electric field. For an index for indicating an influence caused by the Rayleigh scattering, a Multiple of Refractive Index and Power (hereinafter called MRIP) which is defined by a formula F1 is useful.

$$MRIP = \frac{\int_0^r |\Delta(r)| rE^2(r) dr}{\int_0^r rE^2(r) dr} \qquad F1$$

In formula F1, r indicates a distance from a center of the core in a radial direction. $\Delta r$ is a refractive index difference for a clad. E(r) indicates distribution for electric field of the dominant mode in the light which is transmitted.

In a conventional NZ-DSF shown in FIG. 14, MRIP is designed nearly at 0.5. In contrast, in an optical fiber shown in FIG. 1, MRIP is 0.42. Thus, the MRIP is reduced by nearly 10%. As explained in embodiments of the present invention later, it is possible to reduce the transmission loss in a preferable level such as 0.210 dB/km or lower by reducing the Rayleigh loss.

In an optical fiber in this example, it is preferable the chromatic dispersion is higher than +6 ps/nm/km. If the chromatic dispersion is lower than +6 ps/nm/km, it is anticipated that the loss cannot be reduced sufficiently. Thus, by setting the chromatic dispersion at +6 ps/nm/km or higher, the chromatic dispersion does not become zero in the S-Band; therefore, such optical fiber can be used for WDM data transmission.

Also, it is preferable the chromatic dispersion is lower than +15 ps/nm/km. If the chromatic dispersion is higher than +15 ps/nm/km, it is possible to realize the same characteristics even if a refractive index dispersion such as a single-peak refractive index profile and a stepped refractive index profile is used instead of the ring-shaped refractive index profile according to the present invention. That is, there is not merit in using an optical fiber having the ring-shaped refractive index profile.

According to the optical fiber having a core containing two or more layers of which refractive indexes are different such that one of the layer except a center part of the core has the largest refractive index wherein chromatic dispersion is between +6 ps/nm/km or larger and smaller than +15 ps/nm/km in 1550 nm wavelength, it is possible to realize an optical fiber having a ring-shaped refractive index profile with low loss characteristics.

Also, because it is possible to make effective cross sectional area in the 1550 nm wavelength larger than 90 $\mu m^2$, it is possible to realize an optical fiber which can restrict the non-linear effect.

Also, because it is possible to make the dispersion slope in the 1550 nm wavelength smaller than 0.08 $ps/nm^2/km$, it is possible to realize an optical fiber which can control the dispersion in wide range of the wavelength bandwidth; thus it is possible to realize high-speed high-quality optical fiber for data transmission.

Also, by setting the MRIP at 0.45 or lower, it is possible to restrict the transmission loss lower than 0.210 dB/km. Therefore, it is possible to reduce the loss caused by the Rayleigh scattering; thus, it is possible to realize an optical fiber having low loss characteristics.

Hereinafter, embodiments of an optical fiber according to the present invention are shown with reference to drawings.

[First embodiment]

An optical fiber having refractive index profile shown in FIG. 1 is produced. This optical fiber is manufactured such that an area (a) including a core in the optical fiber having refractive index profile shown in FIG. 2 is produced by using Chemical Vapor Disposition (hereinafter called CVD) method and an area (b0) including a clad in the optical fiber having refractive index profile shown in FIG. 2 is produced by using outside vapor phase deposition method. Here, outer diameter of the clad in the optical fiber which is produced is 125 μm as shown in FIG. 2. In this optical fiber, the chromatic dispersion is +8 ps/nm/km in 1550 nm wavelength which satisfies the requirement in product designing aspect. The characteristics of this optical fiber is shown in TABLE 2.

TABLE 2

| | | |
|---|---|---|
| TRANSMISSION LOSS | [dB/km] | 0.206 |
| CABLE CUTOFF WAVELENGTH λ cc | [nm] | 1450 |
| EFFECTIVE CORE CROSS SECTIONAL AREA $A_{eff}$ | [μm²] | 100.6 |
| MODE FIELD DIAMETER MFD | [μm] | 9.26 |
| CHROMATIC DISPERSION | [ps/nm/km] | 8.0 |
| DISPERSION SLOPE | [ps/nm²/km] | 0.069 |
| BENDING LOSS @ 20 φ | [dB/m] | 10.5 |
| POLARIZATION MODE DISPERSION PMD | [ps/√km] | 0.07 |

*Above values are measured under condition of 1550 nm wavelength

Here, $A_{eff}$ is approximately 100 μm². Dispersion slope is 0.069 ps/nm²/km. Thus, it can be confirmed that $A_{eff}$ is enlarged and the dispersion slope is reduced. In addition, the transmission loss in the 1550 nm wavelength is 0.206 dB/km; thus, 0.02 dB/km or more transmission loss is reduced comparing to the conventional optical fiber having ring-shaped refractive index profile.

Figure 3A:
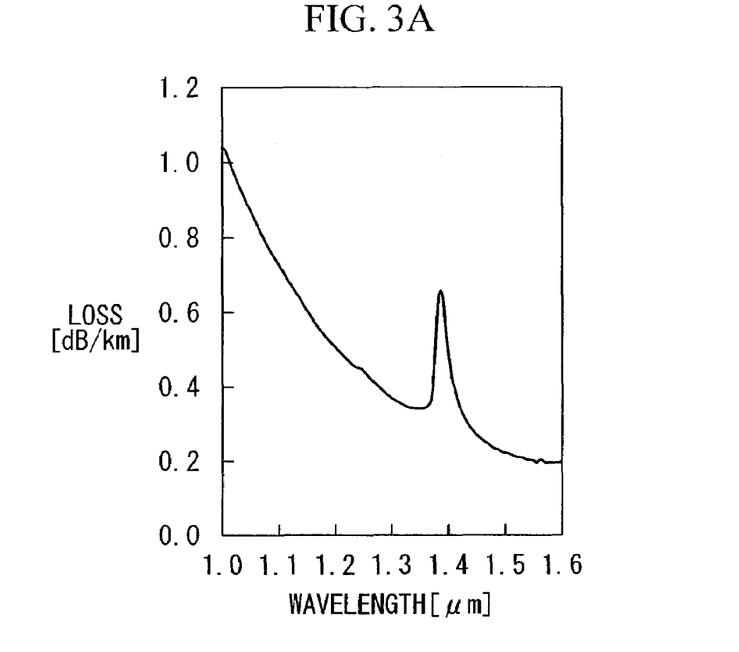
FIGS. 3A and 3B are showing an example of loss wavelength characteristics in an optical fiber according to the present invention.
Figure 3B:
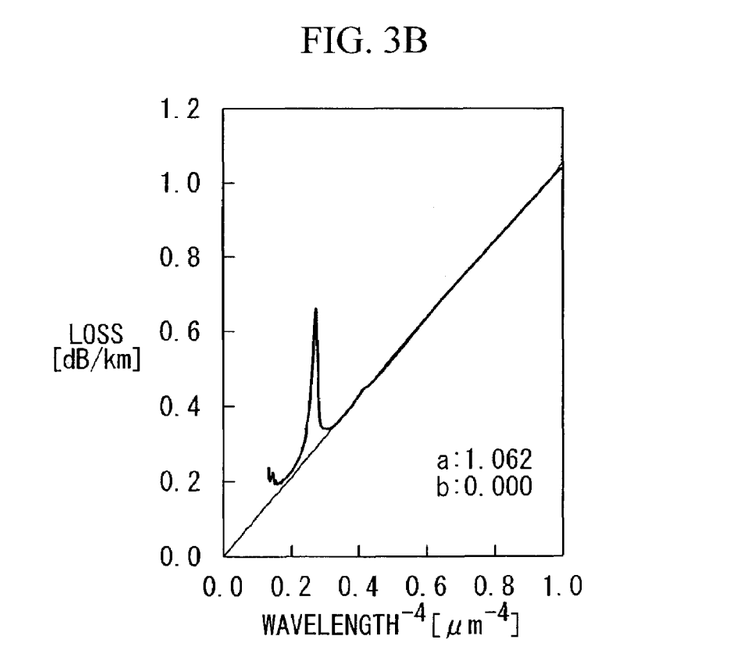

The loss wavelength characteristics for the wavelength λ in this optical fiber is shown in FIG. 3A. The loss value under condition that the unit of the horizontal axis is $1/\lambda^4$ is shown in FIG. 3B. In FIG. 3 in which a graph is plotted by unit of $1/\lambda^4$, a value which is indicated by "a" represents an inclination. In FIG. 3B, value "a" is 1.06. Therefore, it is understood that the characteristics has been improved; thus, nearly the same level as that of the conventional NZ-DSF of improvement has been achieved.

Figure 4:
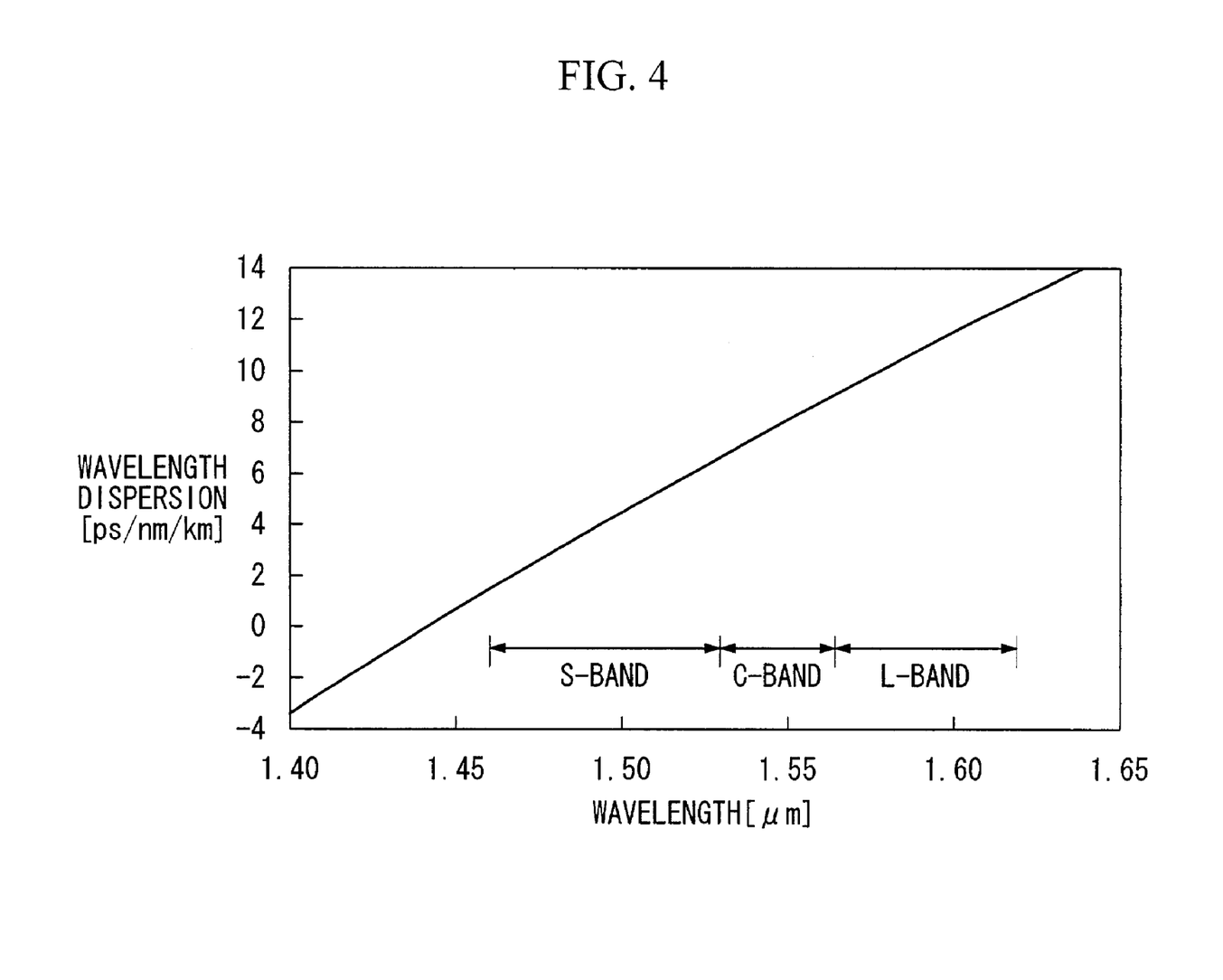
FIG. 4 is a graph for chromatic dispersion characteristics for an optical fiber according to the present invention.

In FIG. 4, the chromatic dispersion characteristics in this optical fiber is shown. The chromatic dispersion in the 1550 nm wavelength is +8 ps/nm/km which is larger than that of the conventional NZ-DSF. Also, the dispersion slope is restricted at 0.065 ps/nm/km which can be understood to be fairly lower level. In this example, the chromatic dispersion is +1 ps/nm/km or more in the S-Band; therefore, not only the C-Band and the L-Band, but also the S-Band can be used for data transmission.

[Second Embodiment]

Figure 5:
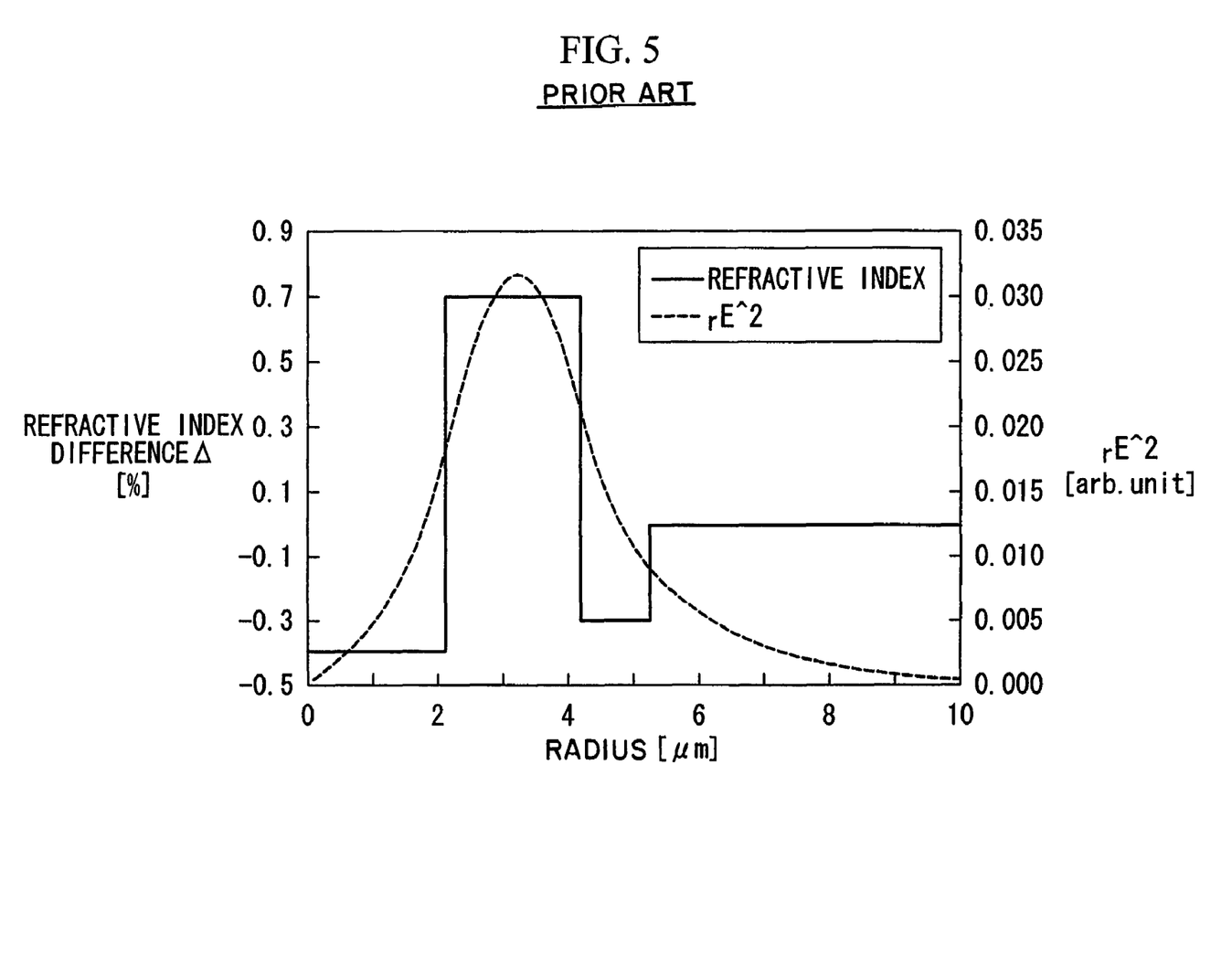
FIG. 5 is an example which is to be compared to the refractive index profile in an optical fiber according to the present invention.
Figure 6:
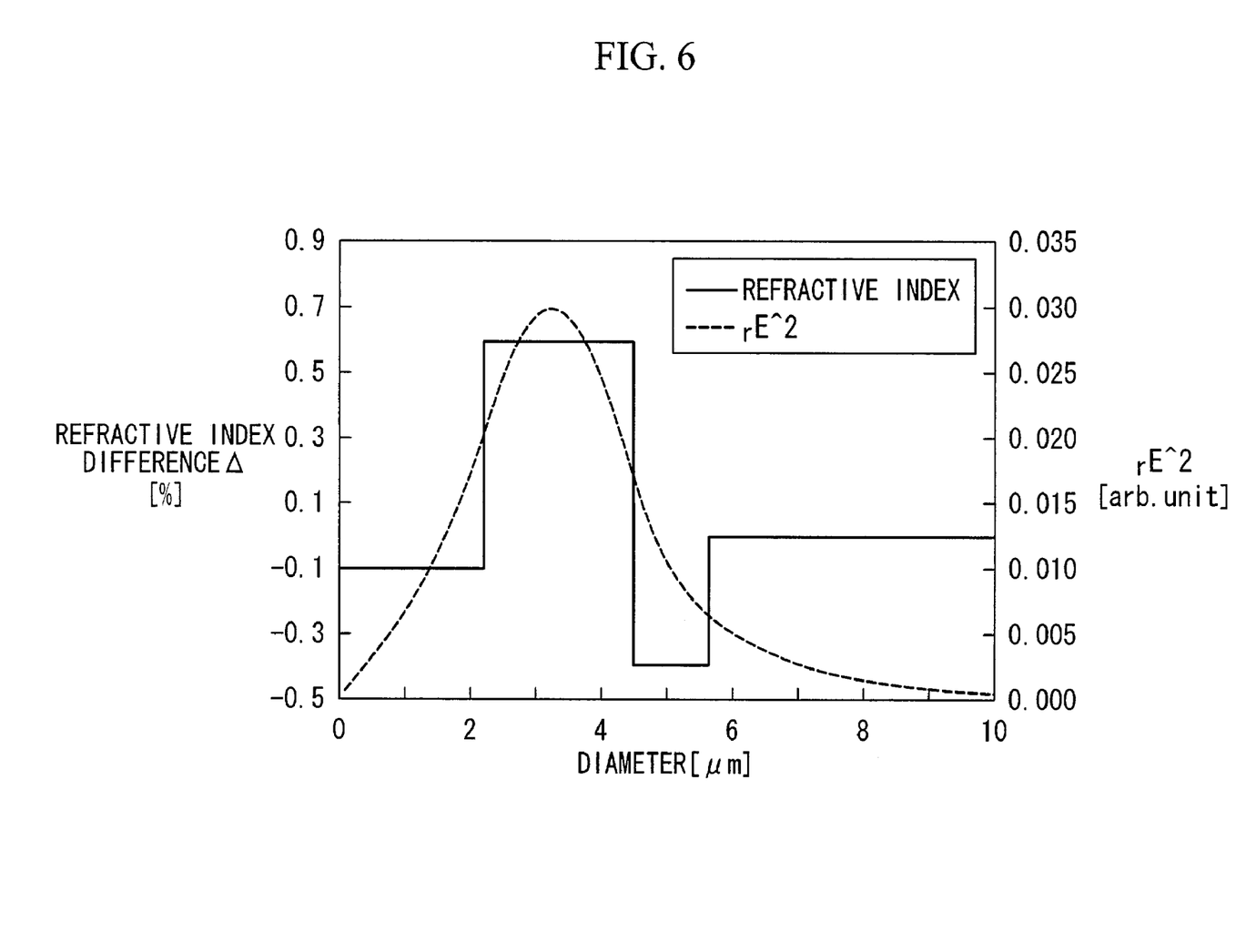
FIG. 6 is another example showing refractive index profile of an optical fiber according to the present invention.

An optical fiber having refractive index profile shown in FIGS. 5 and 6 is produced.

FIG. 5 shows designed value for the refractive index profile in the conventional NZ-DSF chromatic dispersion area. FIG. 6 shows a designed value for the refractive index profile under condition that the chromatic dispersion is set to be nearly +9 ps/nm/km which is larger than that of the conventional NZ-DSF. This optical fiber is manufactured such that an area (a) including a core in the optical fiber having refractive index profile shown in FIG. 2 is produced by using Chemical Vapor Disposition (hereinafter called CVD) method and an area (b) including a clad in the optical fiber having refractive index profile shown in FIG. 2 is produced by using outside vapor phase deposition method. Here, outer diameter of the clad in the optical fiber which is produced is 125 μm as shown in FIG. 2.

In this example of optical fiber, by enlarging the chromatic dispersion to nearly +9 ps/nm/km, the MRIP decreased from 0.50 to 0.43. The characteristics of this optical fiber is shown in TABLES 3 and 4. TABLE 3 shows a characteristics of an optical fiber having refractive index profile in the conventional NZ-DSF chromatic dispersion area as shown in FIG. 5. TABLE 4 shows a characteristics of an optical fiber having refractive index profile under condition that the chromatic dispersion shown in FIG. 6 is nearly +9 ps/nm/km.

TABLE 3

| | | |
|---|---|---|
| TRANSMISSION LOSS | [dB/km] | 0.230 |
| CABLE CUTOFF WAVELENGTH λ cc | [nm] | 1452 |
| EFFECTIVE CORE CROSS SECTIONAL AREA $A_{eff}$ | [μm²] | 95.4 |
| MODE FIELD DIAMETER MFD | [μm] | 8.59 |
| CHROMATIC DISPERSION | [ps/nm/km] | 4.4 |
| DISPERSION SLOPE | [ps/nm²/km] | 0.078 |
| BENDING LOSS @ 20 φ | [dB/m] | 9.5 |
| POLARIZATION MODE DISPERSION PMD | [ps/√km] | 0.05 |

*Above values are measured under condition of 1550 nm wavelength

TABLE 4

| | | |
|---|---|---|
| TRANSMISSION LOSS | [dB/km] | 0.202 |
| CABLE CUTOFF WAVELENGTH λ cc | [nm] | 1420 |
| EFFECTIVE CORE CROSS SECTIONAL AREA $A_{eff}$ | [μm²] | 95.9 |
| MODE FIELD DIAMETER MFD | [μm] | 9.12 |
| CHROMATIC DISPERSION | [ps/nm/km] | 9.7 |
| DISPERSION SLOPE | [ps/nm²/km] | 0.070 |
| BENDING LOSS @ 20 φ | [dB/m] | 9.6 |
| POLARIZATION MODE DISPERSION PMD | [ps/√km] | 0.06 |

*Above values are measured under condition of 1550 nm wavelength

By enlarging the chromatic dispersion at +9 ps/nm/km, the transmission loss is reduced from 0.230 dB/km to 0.202 dB/km.

Figure 7A:
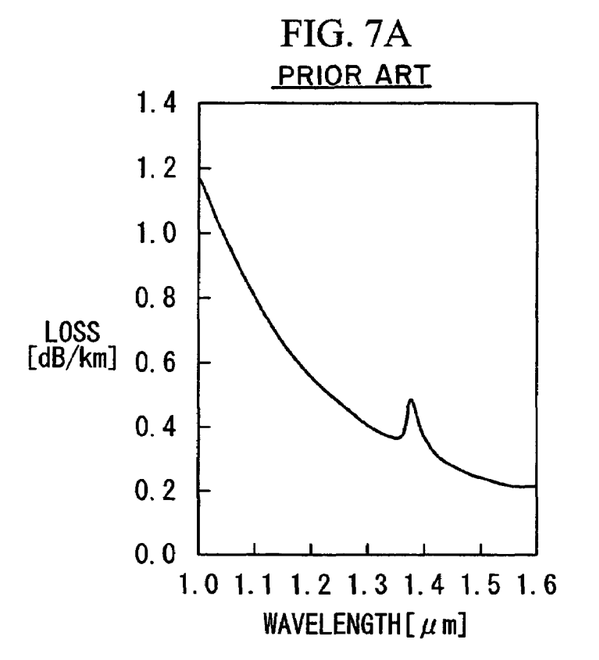
FIGS. 7A and 7B are examples to be compared to loss wavelength characteristics of an optical fiber according to the present invention.
Figure 7B:
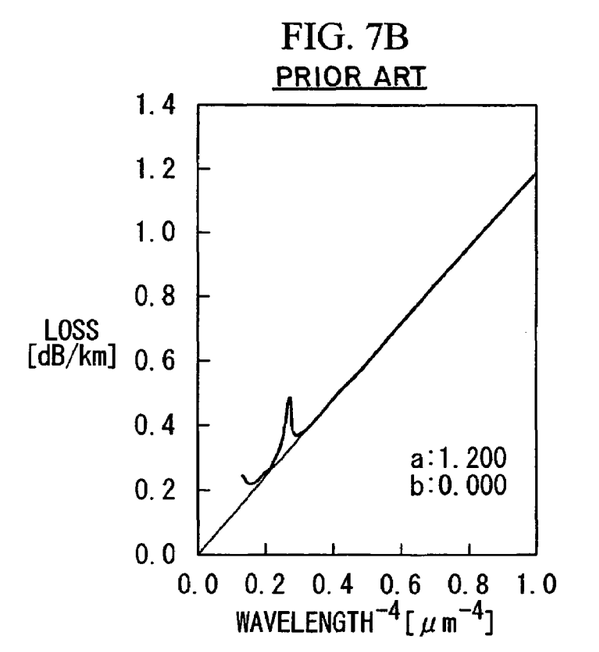
Figure 8A:
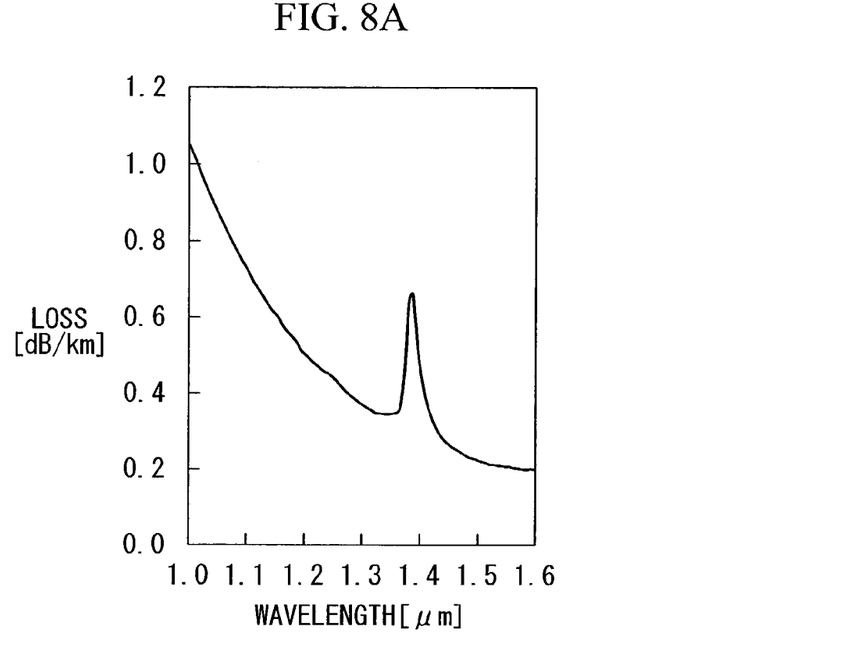
FIGS. 8A and 8B are showing another example for loss wavelength characteristics of an optical fiber according to the present invention.
Figure 8B:
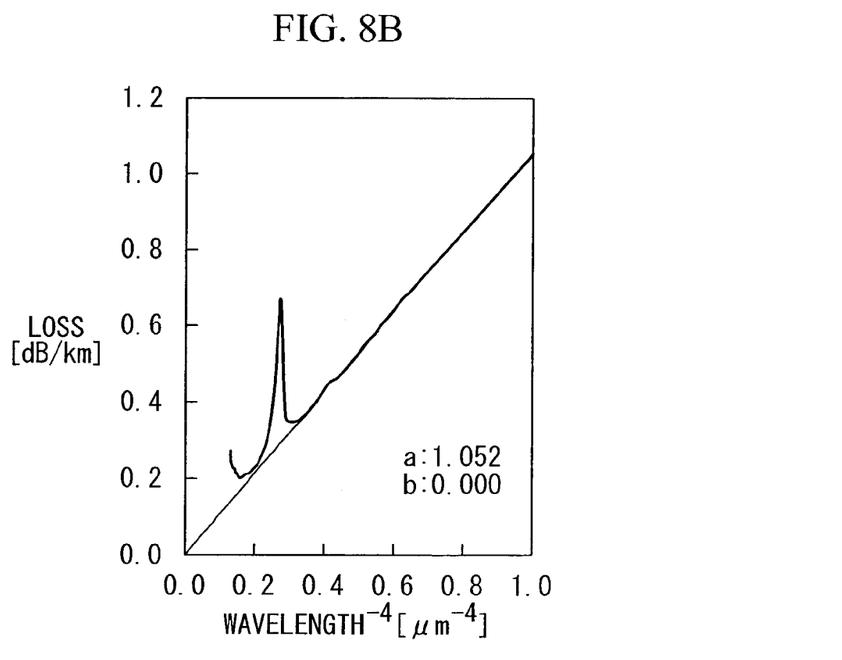

In FIG. 7A, the loss wavelength characteristics for wavelength λ in an optical fiber having refractive index profile in the conventional NZ-DSF chromatic dispersion area is shown. In FIG. 7B, the loss value under condition that a horizontal axis indicates $1/\lambda^4$ is shown. According to these drawings in which a graph is plotted by unit of $1/\lambda^4$, a value which is indicated by "a" represents an inclination. Here, value "a" is 1.20. In contrast, in FIG. 8A, loss wavelength characteristics for the wavelength λ in an optical fiber having refractive index profile under condition that the chromatic dispersion is set at nearly +9 ps/nm/km is shown. Also, in FIG. 8B, the loss value under condition that a horizontal axis indicates $1/\lambda^4$ is shown. According to these drawings in which a graph is plotted by unit of $1/\lambda^4$, a value which is indicated by "a" represents an inclination. Here, value "a" is 1.052. Thus, it is understood that the loss characteristics has been improved.

In this embodiment, by setting the chromatic dispersion in a larger area than that of a conventional optical fiber, it is confirmed that the loss caused by Rayleigh scattering can be reduced.

What is claimed is:

1. An optical fiber comprising:
a core containing two or more layers of different refractive indexes such that one of the layers other than a center part of the core has a largest refractive index; and a cladding, wherein
a chromatic dispersion of the optical fiber is between +6 ps/nm/km and +15 ps/nm/km at a wavelength of 1550 nm, and
a transmission loss of the optical fiber is equal to or less than 0.210 dB/km,
wherein there are four layers of different refractive index in the core, an effective cross sectional area of the optical fiber is larger than 90 μm$^2$ at a wavelength of 1550 nm, and the dispersion slope of the optical fiber is smaller than 0.07 ps/nm$^2$/km.

2. An optical fiber, comprising:
a core containing two or more layers of different refractive indexes such that one of the layers other than a center part of the core has a largest refractive index; and a cladding, wherein
a chromatic dispersion of the optical fiber is between +6 ps/nm/km and +15 ps/nm/km at a wavelength of 1550 nm, and
a transmission loss of the optical fiber is ecual to or less than 0.210 dB/km,
wherein the optical fiber has a power product MRIP of a refractive index profile which is smaller than 0.45, wherein the power product MRIP of the refractive index profile is defined by a formula F1

$$MRIP = \frac{\int_0^r |\Delta(r)| r E^2(r) dr}{\int_0^r r E^2(r) dr} \quad \text{F1}$$

wherein
r is a distance from a center of the core in a radial direction,
Δ(r) is a relative refractive index difference of the core, at a position defined by the distance r, with respect to the cladding, and
E (r) is an electric field distribution for a fundamental mode of a transmitted light at the position defined by the distance r.

3. An optical fiber, comprising:
a core containing two or more layers of different refractive indexes such that one of the layers other than a center part of the core has a largest refractive index; and a cladding, wherein
a chromatic dispersion of the optical fiber is between +6 ps/nm/km and +15 ps/nm/km at a wavelength of 1550 nm, and
a transmission loss of the optical fiber is ecual to or less than 0.210 dB/km,
wherein the core contains more than three layers, each of a different refractive index; and
wherein the optical fiber has a power product MRIP of a refractive index profile which is smaller than 0.45, wherein the power product MRIP of the refractive index profile is defined by a formula F1

$$MRIP = \frac{\int_0^r |\Delta(r)| r E^2(r) dr}{\int_0^r r E^2(r) dr} \quad \text{F1}$$

wherein
r is a distance from a center of the core in a radial direction,
Δ(r) is a relative refractive index difference of the core, at a position defined by the distance r, with respect to the cladding, and
E (r) is an electric field distribution for a fundamental mode of a transmitted light at the position defined by the distance r.

4. An optical fiber, comprising:
a core containing two or more layers of different refractive indexes such that one of the layers other than a center part of the core has a largest refractive index; and a cladding, wherein
a chromatic dispersion of the optical fiber is between +6 ps/nm/km and +15 ps/nm/km at a wavelength of 1550 nm, and
a transmission loss of the optical fiber is euual to or less than 0.210 dB/km,
wherein the refractive index of a layer in a center part of the core is lower than the refractive index of the cladding; and
wherein the optical fiber has a power product MRIP of a refractive index profile which is smaller than 0.45, wherein the power product MRIP of the refractive index profile is defined by a formula F1

$$MRIP = \frac{\int_0^r |\Delta(r)| r E^2(r) dr}{\int_0^r r E^2(r) dr} \quad \text{F1}$$

wherein
r is a distance from a center of the core in a radial direction,
Δ(r) is a relative refractive index difference of the core, at a position defined by the distance r, with respect to the cladding, and
E (r) is an electric field distribution for a fundamental mode of a transmitted light at the position defined by the distance r.

5. An optical fiber, comprising:
a core containing two or more layers of different refractive indexes such that one of the layers other than a center part of the core has a largest refractive index; and a cladding, wherein
a chromatic dispersion of the optical fiber is between +6 ps/nm/km and +15 ps/nm/km at a wavelength of 1550 nm, and
a transmission loss of the optical fiber is ec,ual to or less than 0.210 dB/km,
wherein an effective cross sectional area of the optical fiber at a wavelength of 1550 nm is larger than 90 μm$^2$; and
wherein the optical fiber has a power product MRIP of a refractive index profile which is smaller than 0.45, wherein the power product MRIP of the refractive index profile is defined by a formula F1

$$MRIP = \frac{\int_0^r |\Delta(r)| rE^2(r)dr}{\int_0^r rE^2(r)dr} \quad \text{F1}$$

wherein r is a distance from a center of the core in a radial direction,

Δ(r) is a relative refractive index difference of the core, at a position defined by the distance r, with respect to the cladding, and E (r) is an electric field distribution for a fundamental mode of a transmitted light at the position defined by the distance r.

6. An optical fiber, comprising:

a core containing two or more layers of different refractive indexes such that one of the layers other than a center part of the core has a largest refractive index; and a cladding, wherein a chromatic dispersion of the optical fiber is between +6 ps/nm/km and +15 ps/nm/km at a wavelength of 1550 nm, and a transmission loss of the optical fiber is equal to or less than 0.210 dB/km, wherein a dispersion slope of the optical fiber at a wavelength of 1550 nm is less than 0.08 ps/nm²/km; and wherein the optical fiber has a power product MRIP of a refractive index profile which is smaller than 0.45, wherein the power product MRIP of the refractive index profile is defined by a formula F1

$$MRIP = \frac{\int_0^r |\Delta(r)| rE^2(r)dr}{\int_0^r rE^2(r)dr} \quad \text{F1}$$

wherein r is a distance from a center of the core in a radial direction,

Δ(r) is a relative refractive index difference of the core, at a position defined by the distance r, with respect to the cladding, and E (r) is an electric field distribution for a fundamental mode of a transmitted light at the position defined by the distance r.

7. An optical fiber, according to claim 1, wherein the optical fiber has a power product MRIP of a refractive index profile which is smaller than 0.45, wherein the power product MRIP of the refractive index profile is defined by a formula F1

$$MRIP = \frac{\int_0^r |\Delta(r)| rE^2(r)dr}{\int_0^r rE^2(r)dr} \quad \text{F1}$$

wherein r is a distance from a center of the core in a radial direction,

Δ(r) is a relative refractive index difference of the core, at a position defined by the distance r, with respect to the cladding, and E (r) is an electric field distribution for a fundamental mode of a transmitted light at the position defined by the distance r.

* * * * *